United States Patent
Suzuki et al.

(10) Patent No.: US 6,953,635 B2
(45) Date of Patent: *Oct. 11, 2005

(54) HUMIDIFIER FOR FUEL CELL

(75) Inventors: Motohiro Suzuki, Wako (JP); Hiroshi Shimanuki, Wako (JP); Toshikatsu Katagiri, Wako (JP); Yoshio Kusano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,104

(22) Filed: Oct. 3, 2001

(65) Prior Publication Data

US 2002/0039674 A1 Apr. 4, 2002

(30) Foreign Application Priority Data

Oct. 4, 2000 (JP) .................................. P2000-305317

(51) Int. Cl.[7] .......................... H01M 2/02; B01D 47/16
(52) U.S. Cl. ............................. 429/34; 429/26; 429/22; 261/94
(58) Field of Search ..................... 429/30, 34, 26, 429/12, 22; 261/94, 104, 154

(56) References Cited

U.S. PATENT DOCUMENTS

| 5,441,821 | A | | 8/1995 | Merritt et al. ................. 429/17 |
| 5,543,238 | A | | 8/1996 | Strasser ........................ 429/17 |
| 5,939,218 | A | | 8/1999 | Mizuno ........................ 429/23 |
| 6,554,261 | B2 | * | 4/2003 | Katagiri et al. ............. 261/154 |
| 2001/0021467 | A1 | * | 9/2001 | Suzuki et al. ................. 429/12 |
| 2002/0039674 | A1 | * | 4/2002 | Suzuki et al. ................. 429/30 |

FOREIGN PATENT DOCUMENTS

JP          08-273687          10/1996

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A humidifier for fuel cell of the present invention comprises a hollow fiber membrane module in which a hollow fiber membrane bundle, comprising hollow fiber membranes bundled together, is accommodated inside a housing. The module comprises an entrance head which supplies off-gas inside the hollow fiber membranes, an exit head which converges off-gas, which has passed through the hollow fiber membranes, at another end of the hollow fiber membrane module, and an exhaust exit which exhausts liquid, accumulated in the entrance head. According to this humidifier, it is possible to prevent the hollow fiber membranes from becoming blocked by water.

20 Claims, 12 Drawing Sheets

HUMIDIFIER FOR FUEL CELL

BACKGROUND OF THE INVENTION

1. Field of the Invention

The present invention relates to a water-permeable humidifier for fuel cell which uses, for example, hollow fiber membranes.

2. Description of Related Art

A PEM (Polymer Electrolytic Membrane) type fuel cell, which can be mounted in a fuel cell vehicle and the like, is formed by laminating an membrane electrode assembly comprising an anode and a cathode on each side of a solid polymer electrolytic membrane, and a separator which provides gas paths for supplying reactive gas on each side of the membrane electrode assembly and supports the membrane electrode assembly from both sides.

In this PEM-type fuel cell, hydrogen gas is supplied as fuel supply gas to the anode, and oxygen or air is supplied as oxidizing agent supply gas to the cathode, and the chemical energy generated by the oxidation-reduction reaction of the fuel supply gas is extracted as direct electrical energy.

That is, electrical energy can be extracted by a series of electrochemical reactions when the hydrogen gas is ionized on the anode side and moves through the solid polymer electrolytic membrane, and the electrons pass through an external load to the cathode side, reacting with the oxygen and generating water.

In this fuel cell, when the solid polymer electrolytic membrane dries, the ion transmittancy rate decreases and the energy conversion rate is reduced. Consequently, water must be supplied to the solid polymer electrolytic membrane in order to maintain good ion transmission.

To achieve this, this type of fuel cell comprises a humidifier which humidifies the fuel supply gas and oxidizing agent supply gas, and supplies water to the solid polymer electrolytic membrane, thereby maintaining good reaction.

A conventional example of this type of humidifier, disclosed in Japanese Patent Application No. 8-273687, is a water-permeable humidifier comprising a hollow fiber membrane which allows steam vapor to pass in the direction of the thickness of a membrane.

FIG. 16 is a diagram showing the constitution of a fuel cell system comprising a conventional humidifier. Oxidizing agent supply gas comprises outside air, and is pressurized by a supercharger 81 and supplied via an oxidizing agent supply gas pipe 82 to a humidifier for oxidizing agent 80A. The humidifier for oxidizing agent 80A humidifies the oxidizing agent supply gas and supplies it to the cathode of a fuel cell (hereinafter "stack") 83. After the oxygen supplied in air to the cathode has been used as the oxidizing agent, it is exhausted as off-gas from the stack 83. The off-gas contains water which was generated at the time of the reaction in the stack 83, and is fed from the stack 83 via an off-gas pipe 84 to the humidifier for oxidizing agent 80A. The humidifier for oxidizing agent 80A transfers steam vapor in the off-gas to the oxidizing agent supply gas. Thereafter, the off-gas is exhausted.

Fuel supply gas comprising hydrogen gas is supplied via a gas pipe for fuel supply 85 to a humidifier for fuel 80B, which humidifies the hydrogen gas and supplies it to the anode of the stack 83. Part of the hydrogen gas supplied to the anode is used as fuel, and is applied in the oxidation-reduction reaction. After part of the hydrogen gas has been applied in the reaction, it is exhausted from the stack 83 as off-gas.

However, the solid polymer electrolytic membrane allows steam vapor to pass through from the side of the membrane where water density is high to the side where water density is low as a result of ion hydration. As described above, the off-gas flowing on the cathode side contains water which was generated at the time of reaction, and consequently has a higher water density than the off-gas flowing on the anode side, but the ion hydration causes the water in the off-gas flowing on the cathode side to become steam vapor and pass through the solid polymer electrolytic membrane, and is dispersed in the off-gas flowing on the anode side. Therefore, the off-gas on the anode side also contains water.

The anode-side off-gas containing water is fed from the stack 83 via a pipe for off-gas 86 to the humidifier for fuel 80B. The humidifier for fuel 80B transfers the steam vapor in the off-gas to the oxidizing agent supply gas. Thereafter, the off-gas is exhausted.

FIG. 17 shows the humidifier for oxidizing agent 80A and the humidifier for fuel 80B (hereinafter jointly referred to as humidifier 80 unless there is a need to distinguish them). The humidifier 80 comprises a plurality of humidifying units 91, and an entrance head 92 and an exit head 93 which join the humidifying units 91 in parallel. The humidifying units 91 comprise a great number of tube-like porous hollow fiber membranes 95, which are bundled together inside a cylindrical housing 94. The porous hollow fiber membrane is consisted of steam vapor-permeable membranes (water-permeable membranes). Partitioning members 96 tie both ends of the hollow fiber membranes 95, and achieve an airtight seal between the outer surfaces of the hollow fiber membranes 95, and between the outer surfaces of the hollow fiber membranes 95 and the housings 94. One end of the housings 94 is connected to the entrance head 92, and the other end is connected to the exit head 93. Gas entrances 97a and gas exits 97b are provided in the outer peripheral section of the housings 94 further inward from the partitioning members 96. The gas entrances 97a of the housings 94 are connected together via an unillustrated connection path, provided outside the housings 94. Similarly, the gas exits 97b are connected together via an unillustrated connection path, provided outside the housings 94.

In the humidifier 80, reactive gas is supplied from the gas entrance hole 97a in the housing 94 of each humidifying unit 91, passing between the hollow fiber membranes 95 of the housings 94 and exiting from the gas exit 97b. On the other hand, off-gas is supplied to the entrance head 92, from the entrance head 92 to the housing 94 of the humidifying unit 91 and into the hollow section of the hollow fiber membrane 95, passing through the hollow section and from the other side of the housing 94 into the exit head 93, and exiting from the exit head 93.

The hollow fiber membranes 95 have countless capillary tube sections running parallel to the diameter; steam vapor in the off-gas, which is fed into the hollow sections of the hollow fiber membranes 95, condenses in the capillary tube sections and moves to the outer peripheral side, where it is transferred by evaporation to reactive gas. That is, the humidifier 80 transfers the water in the off-gas to the reactive gas, thereby humidifying the reactive gas.

However, in the conventional humidifier 80, steam vapor in the off-gas condenses in the entrance head 92, causing the following problems.

When condensation had seeped into the hollow section of the hollow fiber membrane 95, the condensation cannot pass through the hollow fiber membrane 95 and flows through the hollow section. As a consequence, the steam vapor is exhausted without being recovered, reducing the water recovery rate. When the water recovery rate decreases, the humidification capability of the humidifier decreases.

Also, if the fuel cell is excessively humidified, a problem may occur in that gas flow paths in the fuel cell become closed by the excess water and the output of the fuel cell decreases.

Furthermore, when condensation accumulates in the entrance head 92 and the water level rises higher than the minimum position of the hollow fiber membrane 95 in the humidifying unit 91, the condensation closes up the entrance side of the hollow fiber membrane 95, reducing the flow area for the off-gas and increasing pressure loss. Further, the decrease in the flow area of the off-gas leads to a reduction in the water recovery rate, and a consequent decline in the humidification capability. The same problems arise when condensation accumulates in the exit head 93.

SUMMARY OF THE INVENTION

It is an object of the present invention to provide a humidifier for fuel cell having superior humidification capability which can prevent problems arising from condensation by removing the condensation from the off-gas prior to feeding the off-gas to the hollow fiber membranes.

In order to achieve the above object, the humidifier for fuel cell of the present invention comprises:

a hollow fiber membrane module having a hollow fiber membrane bundle, comprising a plurality of hollow fiber membranes bundled together, and a housing which accommodates the hollow fiber membrane bundle, the hollow fiber membrane module feeding a reactive gas, which is to be supplied to a fuel cell, inside the housing and outside the hollow fiber membranes, and feeding off-gas, exhausted from the fuel cell, into the hollow fiber membranes, thereby transferring water in the off-gas via the hollow fiber membranes to the reactive gas and humidifying the reactive gas;

an off-gas flow entrance which the off-gas flows through into the hollow fiber membrane, the off-gas flow entrance being provided in one end of the hollow fiber membrane module; and a liquid exhaust mechanism which exhausts liquid, which has been generated from the off-gas flowing through the off-gas flow entrance.

According to this constitution, the liquid exhaust mechanism exhausts liquid which has accumulated in the off-gas flow entrance, preventing or reducing blocking of the hollow fiber membranes by water. Therefore, the number of hollow fiber membranes for humidification can be increased, reduction in the flow path area of the off-gas can be reduced, and increase in pressure loss of off-gas can be prevented.

The humidifier may comprises a water blockage detecting unit which detects water blockage of the hollow fiber membrane in the off-gas flow entrance, the liquid exhaust mechanism being controlled in accordance with a detection result of the water blockage detecting unit.

According to this constitution, by detecting water blockage of the hollow fiber membrane by the water blockage detecting unit, the liquid accumulated in the off-gas entrance can be reliably exhausted before the water blockage of the hollow fiber membranes spreads, increasing reliability.

The humidifier may comprises a storing unit which stores the exhausted liquid, and a supplementary humidification unit which performs supplemental humidification of the reactive gas by using the liquid stored in the storing unit.

According to this constitution, exhausted liquid is stored in the storing unit and is reused in the humidification of the reactive gas. Therefore, humidification capability is further increased. In particular, in the case where this construction is applied to the humidifier for the anode side, because the frequency of opening the liquid exhaust mechanism can be reduced, the leak of the reactive gas from through the liquid exhaust mechanism is reduced, and fuel consumption of the fuel cell can be improved.

The humidifier may comprises an output power detecting unit, which detects an output power of the fuel cell, and a controller, which uses the liquid exhaust mechanism to exhaust the liquid when the output power detected by the output power detecting unit is below a predetermined value.

According to this constitution, the opening and closing operation of the liquid exhaust mechanism can be achieved automatically based on the output power of the fuel cell.

Another humidifier according to the present invention comprises:

a hollow fiber membrane module having a hollow fiber membrane bundle, comprising a plurality of hollow fiber membranes bundled together, and a housing which accommodates the hollow fiber membrane bundle, the hollow fiber membrane module feeding off-gas, exhausted from a fuel cell, inside the housing and outside the hollow fiber membranes, and feeding a reactive gas to be supplied to the fuel cell into the hollow fiber membranes, thereby transferring water in the off-gas via the hollow fiber membranes to the reactive gas and humidifying the reactive gas;

a supply gas flow exit through which the reactive gas is exhausted from inside the hollow fiber membranes, the supply gas flow exit being provided in one end of the hollow fiber membrane module; and a liquid exhaust mechanism which exhausts liquid, which has been generated from the reactive gas fed through the supply gas flow exit.

According to this constitution, even when the temperature of the reactive gas decreases after the reactive gas has passed the hollow fiber membrane module, causing water in the reactive gas to condense and liquefy, the liquid in the reactive gas can be exhausted prior to supplying the reactive gas to the fuel cell, so that condensation is not supplied to the fuel cell. Therefore, it is possible to prevent closure of the flow path caused by excess humidification of the fuel cell membrane and a great amount of generated water.

The humidifier may comprises a water level sensor, which detects accumulation of water in the supply gas feed exit, and a controller, which uses the liquid exhaust mechanism to exhaust the water when the water level sensor has detected that water is accumulating.

According to this constitution, the opening and closing operation of the liquid exhaust mechanism can be achieved automatically based on the water level in the supply gas feed exit.

The humidifier may comprises an output power detecting unit, which detects an output power of the fuel cell, and a controller, which uses the liquid exhaust mechanism to exhaust the liquid when the output power detected by the output power detecting unit is below a predetermined value.

According to this constitution, when the cell voltage as decreased, it is determined that water in the reactive gas is accumulating in the gas flow path, and the amount of humidification is not changed, and the water in the reactive gas is exhausted immediately before the reactive gas is supplied to the fuel cell. Therefore, humidification in the gas flow path can be eliminated.

The fuel cell system of the present invention comprises:

a fuel cell which generates electricity by a supply of reactive gas thereto; and a water-permeable humidifier which humidifies the reactive gas by using water contained in off-gas, exhausted from the fuel cell;

the fuel cell being formed by laminating an membrane electrode assembly, comprising an anode and a cathode on each side of a solid polymer electrolytic membrane, gas flow paths along which reactive gas is supplied on each side of the membrane electrode assembly, and a separator, which supports the membrane electrode assembly from both sides thereof; and the water-permeable humidifier comprising a liquid exhaust mechanism, which exhausts water generated from at least one of the off-gas and the reactive gas, and a controller, which controls the liquid exhaust mechanism in accordance with the humidification status of the membrane electrode assembly of the fuel cell.

According to this constitution, since the liquid exhaust mechanism is controlled by the controller to exhaust liquid which has accumulated in the humidifier, it is possible to prevent or reduce blocking of the hollow fiber membranes by water.

DETAILED DESCRIPTION OF THE INVENTION

Embodiments of the humidifier for fuel cell according to the present invention will be explained with reference to FIGS. 1 to 15. Each of the following embodiments describes a humidifier for a fuel cell which is mounted in a fuel cell vehicle, but the present invention is not limited to this and can be applied to fuel cells other than those for vehicles. Also, features of the following embodiments can be combined with each other.

Embodiment 1

A first embodiment of the humidifier for fuel cell according to this invention will be explained with reference to FIGS. 1 to 10.

Figure 1:
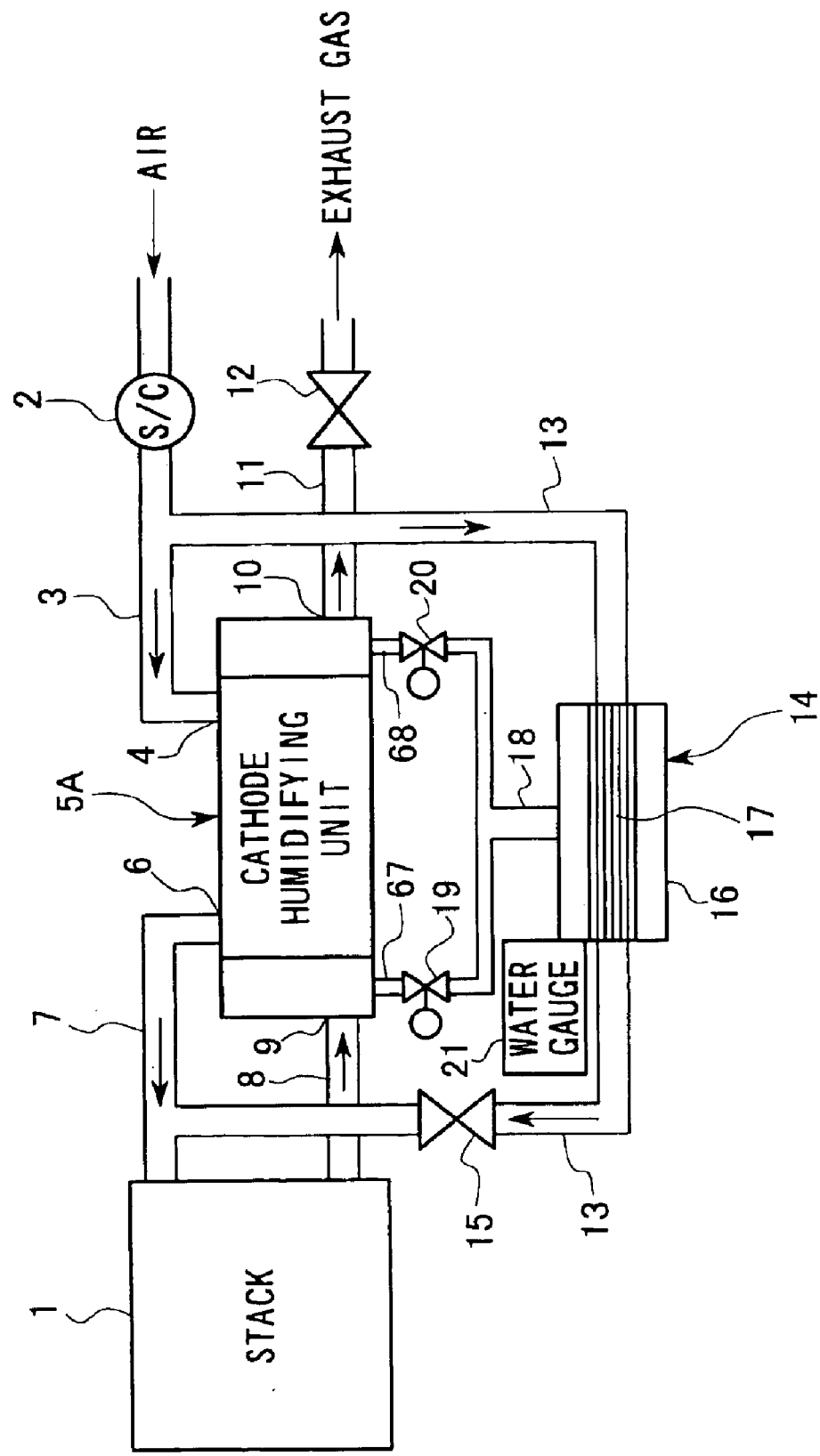
FIG. 1 is a block diagram showing a first embodiment of the humidifier for fuel cell according to this invention.

FIG. 1 is a diagram showing a reactive gas supply system on a cathode side of a fuel cell (hereinafter "stack") 1 which is mounted in a fuel cell vehicle.

Oxidizing agent supply gas comprising air is pressurized by a supercharger 2, and supplied via an air supply pipe 3 from a reactive gas entrance 4 to a cathode humidifying unit 5A; the air is humidified as it passes through the cathode humidifying unit 5A. Then, the air is fed out from a reactive gas exit 6 of the cathode humidifying unit 5A along an air supply pipe 7, and via the air supply pipe 7 to the cathode of the stack 1. Oxygen in the air, which has been supplied to the cathode, is used as an oxidizing agent and is thereafter exhausted as exhaust gas (hereinafter "off-gas") from an off-gas pipe 8 of the stack 1.

The off-gas contains water, generated at the time of reaction in the stack 1, and is supplied via an off-gas pipe 8 from an off-gas entrance (exhaust gas entrance) 9 to the cathode humidifying unit 5A. As the off-gas passes through the cathode humidifying unit 5A, steam vapor in the off-gas is transferred to reactive gas comprising air, thereby humidifying the air. Thereafter, the off-gas is exhausted from an off-gas exit (exhaust gas exit) 10 of the cathode humidifying unit 5A to an off-gas pipe 11, and exhausted via a pressure adjusting valve 12. The pressure adjusting valve 12 adjusts pressure in the stack 1.

Figure 2:
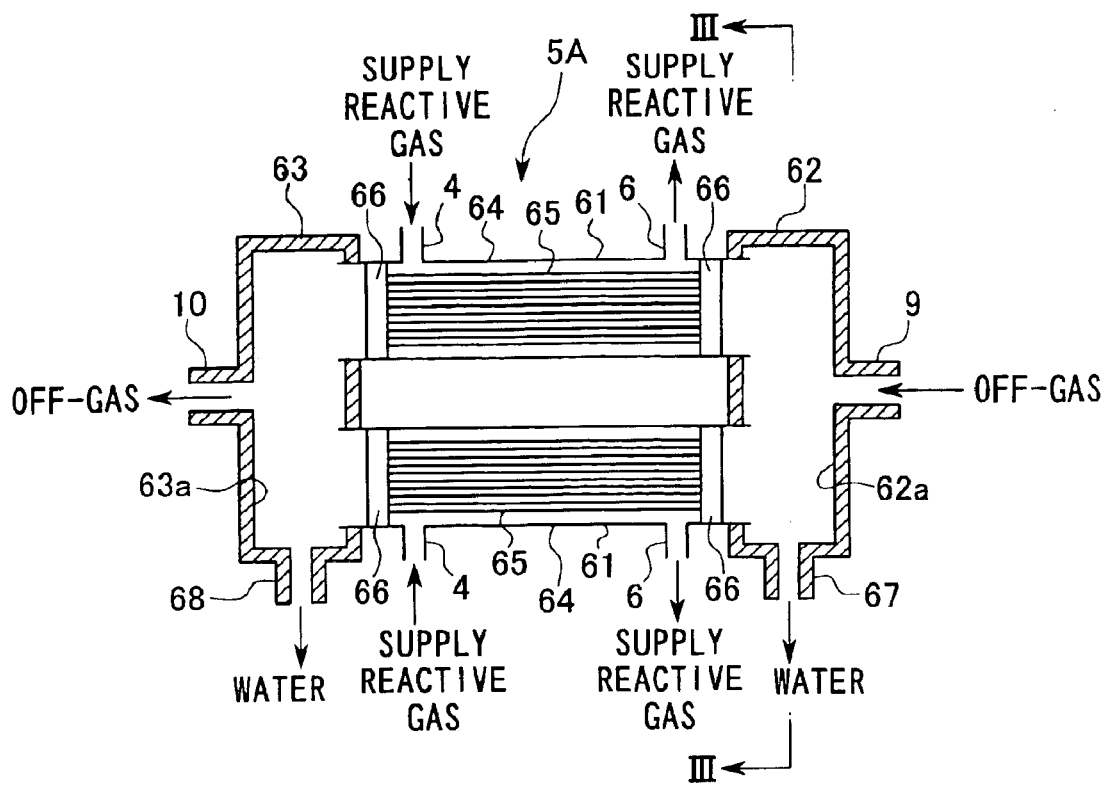
FIG. 2 is a cross-sectional view of a cathode humidifier in the first embodiment.
Figure 3:
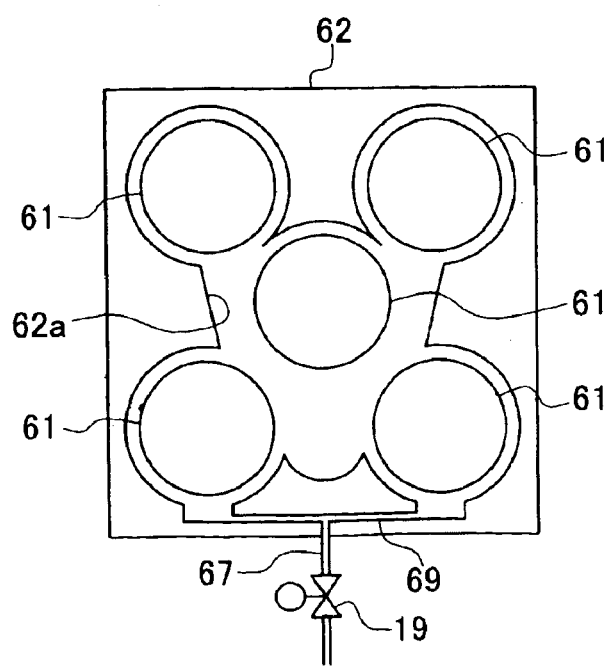
FIG. 3 is a cross-sectional view taken along the line III—III of FIG. 2.
Figure 4:
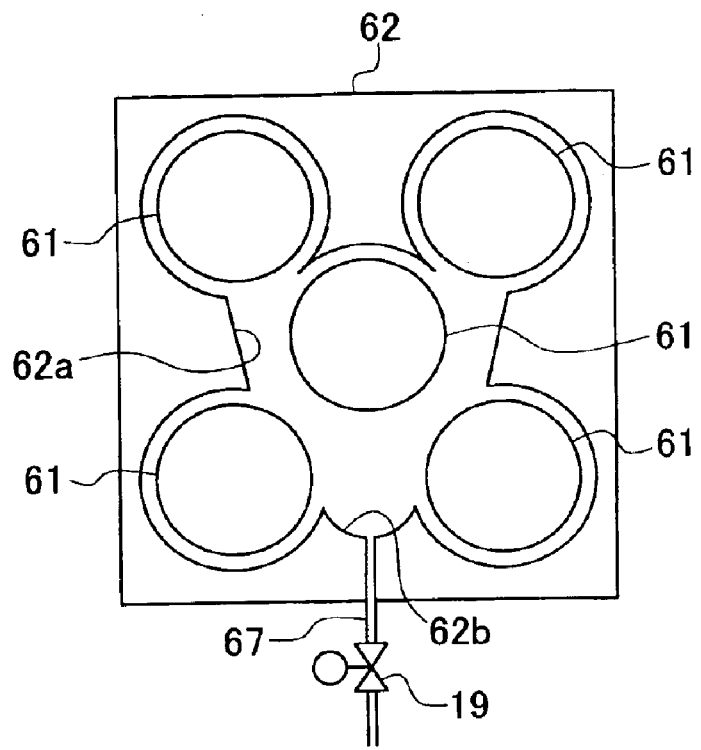
FIG. 4 is a cross-sectional view corresponding to FIG. 3 of a modification of the cathode humidifier of the first embodiment.

The cathode humidifying unit 5A will be explained based on FIGS. 2 to 4.

The cathode humidifying unit 5A comprises a plurality of (five in this embodiment) hollow fiber membrane modules 61, an entrance head (exhaust gas entrance) 62 and an exit head (exhaust gas exit) 63, which join the hollow fiber membrane modules 61 in parallel. The reactive gas comprise a great number of tube-like porous hollow fiber membranes 65, comprising steam vapor-permeable membrane (water-permeable membrane), the hollow fiber membranes 65 being bundled together inside a cylindrical housing 64. The hollow fiber membranes 65 are tied at each end by partitioning members 66, achieving an airtight seal between the outer surfaces of the hollow fiber membranes 65, and between the outer surfaces of the hollow fiber membranes 65 and the housings 64.

One end of each housing 64 of the hollow fiber membrane modules 61 connects to the entrance head 62 having an off-gas entrance 9, and the other end connects to the exit head 63 having an off-gas exit 10. Drainage holes 67 and 68 are provided in the bottoms of the entrance head 62 and the exit head 63 respectively, enabling water which has accumulated in the bottoms of the entrance head 62 and the exit head 63 to be exhausted. As shown in FIG. 3, the drainage hole 67 of the entrance head 62 may extend from a connection path 69 which connects the bottom section of the internal space 62a of the entrance head 62; alternatively, as shown in FIG. 4, the drainage hole 67 may extend from a position 62b where water is most likely to accumulate in the internal space 62 of the entrance head 62. The same goes for the drainage hole 68 of the exit head 63.

Reactive gas entrances 4 and reactive gas exits 6 are provided in the outer peripheral section of the housings 64 at a position which is further inward from the partitioning members 66. The reactive gas entrances 4 of the housings 64 are connected together via an unillustrated connection path, provided outside the housings 64. Similarly, the reactive gas exits 6 are connected together via an unillustrated connection path, provided outside the housings 64.

In the cathode humidifying unit 5A, reactive gas comprising air is fed into the housing 64 of each hollow fiber membrane module 61 from the reactive gas entrances 4 of the housings 64, passing between the hollow fiber membranes 65 in the housings 64 and out from the reactive gas exit 6. On the other hand, the off-gas is fed from the off-gas entrance 9 to the internal space 62a of the entrance head 62, passing through the internal space 62a and from one end of the housings 64 of the hollow fiber membrane module 61 into the hollow fiber membranes 65, and passing through the inside of the hollow fiber membranes 65 and from the other side of the housings 64, converging in the internal space 63a of the exit head 63 and being exhausted from the off-gas exit 10. At this time, in the hollow fiber membrane module 61, the water in the off-gas is transferred via the hollow fiber membranes 65 to the reactive gas, humidifying the reactive gas.

As shown in FIG. 1, an air supply pipe 3 and an air supply pipe 7 are connected by a bypass pipe 13, which bypasses the cathode humidifying unit 5A, and a supplementary humidifier 14 and a supplementary humidification control valve 15 are provided midway along the bypass pipe 13 in sequence from upstream. Similar to the hollow fiber membranes 65 of the cathode humidifying unit 5A, the supplementary humidifier 14 comprises a great number of hollow fiber membranes 17 which are bundled inside a housing 16, and, when the supplementary humidification control valve 15 is open, air which has flowed from the air supply pipe 3 along the bypass pipe 13 passes through inside of the hollow fiber membranes 17, through the downstream bypass pipe 13 and the control valve 15 and into the air supply pipe 7, converges with air which has passed through the cathode humidifying unit 5A and is supplied to the stack 1. In this embodiment, the bypass pipe 13, the supplementary humidifier 14, and the supplementary humidification control valve 15 comprise a supplementary humidification unit.

The housing 16 connects via a drainage pipe 18 to drainage control valves (liquid exhaust mechanisms) 19 and 20, which are attached to the drainage holes 67 and 68 of the cathode humidifying unit 5A, enabling water which has accumulated in the entrance head 62 and the exit head 63 of the cathode humidifying unit 5A to be led into the housing 16. In the first embodiment, the housing 16 functions as a storage unit of this invention. Further, the supplementary humidifier 14 comprises a water gauge (water level detection unit) 21 which detects the water level of water in the housing 16. In the supplementary humidifier 14, when air is fed into the hollow fiber membranes 17 while water is still stored in the housing 16, ion hydration of the hollow fiber membranes 17 vaporizes the water in the housing 16; the steam vapor permeates the hollow fiber membranes 17 and is transferred to the air therein, humidifying the air.

In the humidifier for fuel cell of the first embodiment having the constitution described above, when the stack 1 is generating power, oxidizing agent supply gas comprising air is humidified as it passes through the cathode humidifying unit 5A and is supplied to the stack 1, and off-gas which has passed through the stack 1 humidifies the air as its passes through the cathode humidifying unit 5A. There may be cases where water in the off-gas condenses and accumulates in the entrance head 62 or the exit head 63 of the cathode humidifying unit 5A, blocking the hollow fiber membranes 65 of the hollow fiber membrane module 61, but in this humidifier for fuel cell, the drainage control valves 19 and 20 are opened at the time of water accumulation or at a predetermined timing prior thereto, discharging the water (liquid) which has accumulated in the entrance head 62 and the exit head 63. Therefore, the hollow fiber membranes 65 which become blocked by water can be prevented from such blocking, or alternatively, the number of hollow fiber membranes 65 which become blocked by water can be reduced, thereby increasing the number of hollow fiber membranes 65 which can contribute to humidification, and, in addition, preventing reduction in the flow area of the off-gas and preventing increase in the off-gas pressure loss. As a result, the humidification capability of the humidifier for fuel cell increases.

An unillustrated controller controls the drainage control valves 19 and 20 when the hollow fiber membranes 65 have been blocked by water, or prior to blockage. Methods such as the following may be envisaged as a method for determining the timings for opening the drainage control valves 19 and 20 (in other words, a blockage detection unit of the hollow fiber membranes 65).

According to a first method, the drainage control valves 19 and 20 are opened at fixed intervals. This is based on the fact that it is possible to predict the amount of water which will accumulate in the entrance head 62 or the exit head 63 when the stack 1 is operated at fixed intervals.

Figure 5:
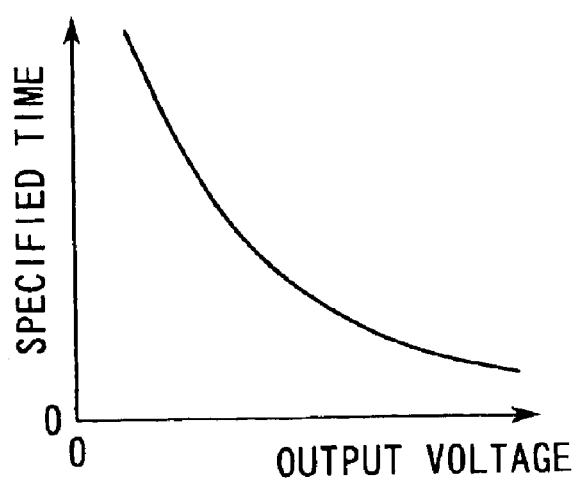
FIG. 5 is a diagram showing one example of the relationship between the output voltage of a fuel cell and specified valve opening intervals.

According to another method, the drainage control valves 19 and 20 are opened at specified times, set at each output voltage of the stack 1. This is more precise than the method of opening the drainage control valves 19 and 20 at fixed intervals. Since more water accumulates in the entrance head 62 or the exit head 63 when the output of the stack 1 is greater, the relationship between the output voltage and the valve opening intervals can be determined and mapped beforehand as shown in FIG. 5, and the drainage control valves 19 and 20 are opened when a specific time has elapsed since each output voltage.

According to another method, the pressure loss between the entrance head 62 and the exit head 63 is detected, and the drainage control valves 19 and 20 are opened when the pressure loss has exceeded a predetermined value (e.g. more than 5 kPa). This method is based on the fact that pressure loss increases in correspondence with increase in the blockage of the hollow fiber membranes 65.

According to yet another method, the drainage control valves 19 and 20 are opened when the output voltage of the stack 1 has dropped below a predetermined value. This is based on the fact that the output voltage of the stack 1 decreases as a result of the insufficiency in humidifying the fuel cell which is caused by drop in the amount of humidification of the supply gas (relative humidity, dew-point, etc.) corresponding to the increase in the blockage of the hollow fiber membranes 65.

According to yet another method, the drainage control valves 19 and 20 are opened when the temperature in the entrance head 62 or the exit head 63 has dropped sharply. This method is based on the fact, demonstrated by experience, that water is accumulating in the entrance head 62 or the exit head 63 when the temperature therein has dropped sharply. It is believed that the water which is accumulating in the entrance head 62 or the exit head 63 vaporizes, and the vaporized latent heat reduces the temperature in the head.

According to another possible operating method, the drainage control valves 19 and 20 are opened when the cell voltage of the single cells forming the stack 1 falls below a predetermined value (e.g. 0.3 V). The stack 1 comprises multiple layers of single cells, in which a solid polymer electrolytic membrane is sandwiched between an anode and a cathode, and the cell voltage of the single cells is made detectable. When the cell voltage of the single cell is below the predetermined value, it is determined that the single cell is blocked and the humidification of the fuel cell is excessive, and the drainage control valves 19 and 20 are opened. Consequently, pressure loss in the hollow fiber membrane module 61 can be reduced and drainage in the stack 1 can be increased, enabling water accumulating in the single cells to be discharged.

As described above, in the humidifier for fuel cell of the first embodiment, the water discharged from the entrance head 62 and the exit head 63 of the cathode humidifying unit 5A is not discarded, but is recovered in the housing 16 of the supplementary humidifier 14 via the drainage pipe 18, and reused as water for supplementary humidification.

When the stack 1 is generating power in the normal state, the ion hydration of the solid polymer electrolytic membrane of the stack 1 supplies water to the off-gas, and the off-gas containing the water is supplied to the cathode humidifying unit 5A; therefore, air which is supplied from the air supply pipe 3 in the cathode humidifying unit 5A can be humidified, and the humidified air can be supplied to the cathode humidifying unit 5A. Consequently, humidification need not be supplemented in this case.

However, when a vehicle or the like starts operating, the amount of humidification of the air in the cathode humidifying unit 5A is insufficient, whereby unhumidified air is supplied to the stack 1, adversely affecting the power-generation of the stack 1. In such cases, humidification must be supplemented. In the first embodiment, the bypass pipe 13, the supplementary humidifier 14, and the supplementary humidification control valve 15 form a supplementary humidification unit, and a temperature gauge and a dew-point gauge (both unillustrated) and the like are provided along the air supply pipe 7. The relative humidity of the air supplied to the stack 1 is detected, and, when the relative humidity is less than a predetermined value (e.g. less than 80%), the supplementary humidification control valve 15 is opened, thereby leading some of the air flowing along the air supply pipe 3 into the bypass pipe 13 and through the supplementary humidifier 14. This humidifies the air, which is returned to the air supply pipe 7, and the humidified air is supplied to the cathode of the stack 1 together with the insufficiently humidified air which has passed through the cathode humidifying unit 5A. Since the supplementary humidifier 14 will not function effectively unless the water level in the housing 16 of the supplementary humidifier 14 is above a predetermined level, the supplementary humidification control valve 15 is opened for supplementary humidification only when the water is above the predetermined level. Therefore, the output voltage of the stack 1 can be increased at start-up and the like. Moreover, the water which has accumulated in the entrance head 62 and the exit head 63 of the cathode humidifying unit 5A can be fed to the supplementary humidifier 14 without being cooled, enabling supplementary humidification to be carried out without applying heat from the outside.

For sake of convenience in the following explanation, the humidification process of closing the supplementary humidification control valve 15 and supplying only air which has passed the cathode humidifying unit 5A to the stack 1 will be abbreviated as "normal humidification", and the humidification process of opening the supplementary humidification control valve 15 and supplementary humidifying the air by feeding it through the supplementary humidifier 14 will be abbreviated as "supplementary humidification".

The supplementary humidification process will be explained with reference to the flowcharts of FIGS. 6 to 10.

Figure 6:
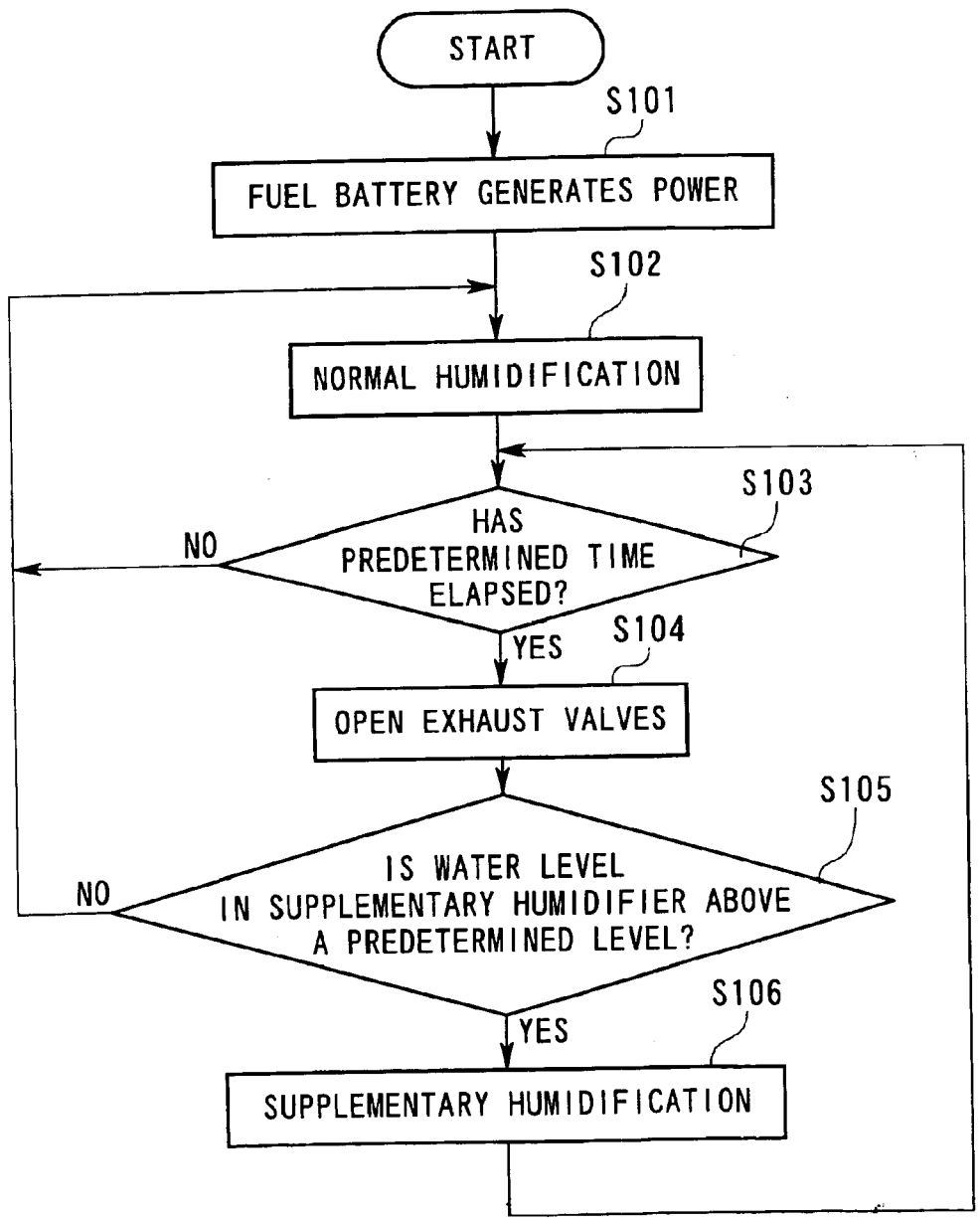
FIGS. 6 to 10 are flowcharts showing supplementary humidification processes of the humidifier for fuel cell in the first embodiment.

In FIG. 6, the stack 1 generates power in step S101, and normal humidification begins in step S102. As already mentioned, the supplementary humidification control valve 15 is closed during normal humidification.

In step S103 it is determined whether a fixed period of time has elapsed, and, when the time has not elapsed, processing returns to step S102 and normal humidification begins again. On the other hand, when it is determined in step S103 that the fixed period of time has elapsed, the drainage control valves 19 and 20 are opened in step S104. As described above, this is because water has accumulated in the entrance head 62 or the exit head 63 after the fixed time has elapsed, causing blockage of the hollow fiber membranes 65, or a danger of such blockage. The drainage control valves 19 and 20 are open for a short period of time. The reason for this is that, when the drainage control valves 19 and 20 are open for a long time, the amount of off-gas flowing through the hollow fiber membranes 65 of the cathode humidifying unit 5A is liable to decrease.

Subsequently, in step S105, it is determined whether the water level in the supplementary humidifier 14, detected by the water gauge 21, is above a predetermined level. When it has been determined that the water level in the supplementary humidifier 14 is below the predetermined level, the humidification capability of the supplementary humidifier 14 is too low to perform effective supplementary humidification; processing therefore returns to step S102 and normal humidification is carried out. On the other hand, when it has been determined in step S105 that the water level in the supplementary humidifier 14 is above the predetermined level, the supplementary humidifier 14 has sufficient capability to perform supplementary humidification; therefore, the supplementary humidification control valve 15 is opened and supplementary humidification is carried out. As a consequence, some of the air flowing in the air supply pipe 3 is humidified by the supplementary humidifier 14, and supplied via the air supply pipe 7 to the stack 1.

Thereafter, processing returns from step S106 to step S103, and it is determined once again whether a fixed period of time has elapsed.

Figure 7:
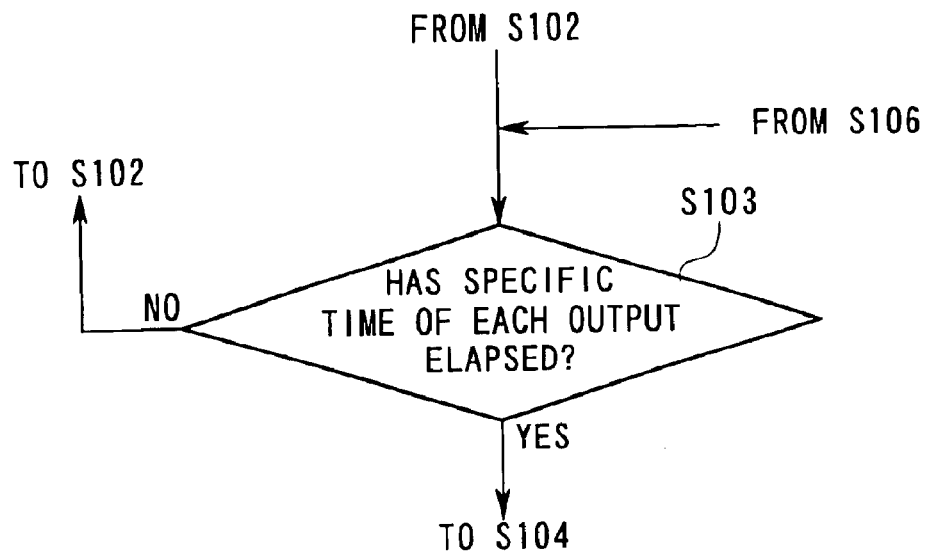

FIG. 7 shows a case where the determination reference regarding whether or not to open the drainage control valves 19 and 20 is "Has a specified period of time set for one output voltage of the stack 1 elapsed?" In this case, in step S103 it is determined whether the specified period of time set for one output voltage of the stack 1 has elapsed; when affirmative, processing proceeds to step S104, and when negative, proceeds to step S102.

Figure 8:
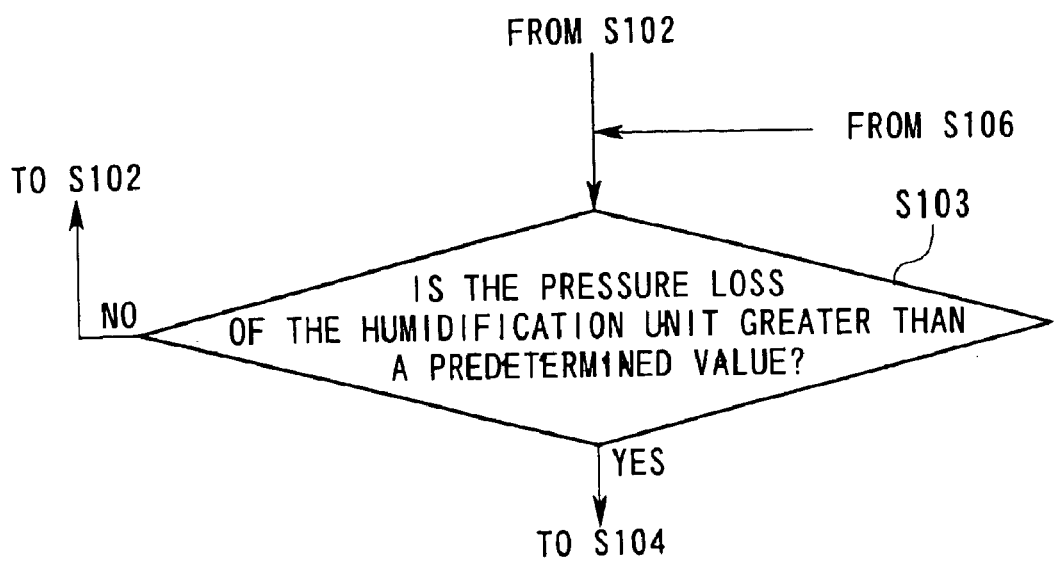

FIG. 8 shows a case where the determination reference regarding whether or not to open the drainage control valves 19 and 20 is "Is the pressure loss of the entrance head 62 and the exit head 63 greater than a predetermined value?" In this case, in step S103, it is determined whether or not the pressure loss is greater than the predetermined value; when affirmative, processing proceeds to step S104, and when negative, proceeds to step S102.

Figure 9:
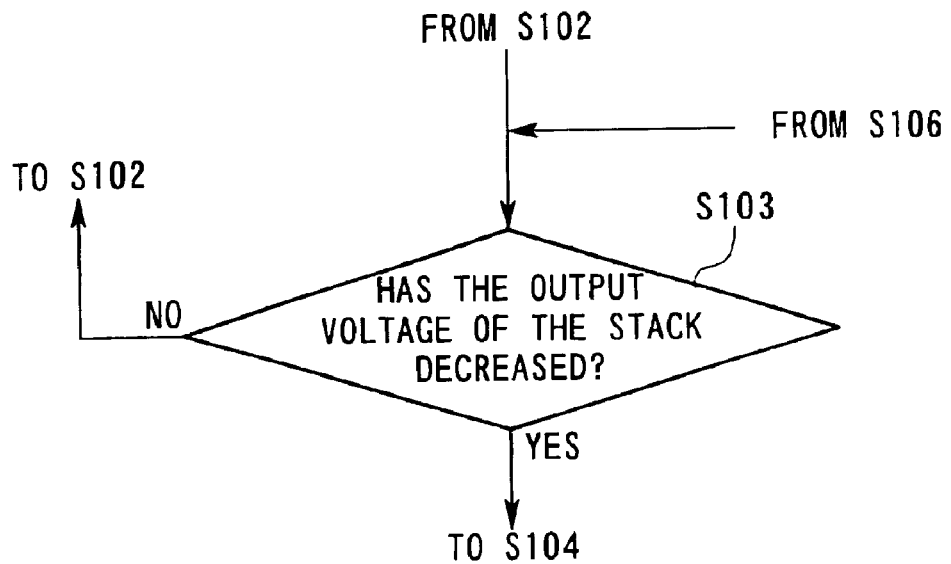

FIG. 9 shows a case where the determination reference regarding whether or not to open the drainage control valves 19 and 20 is "Is the output voltage of the stack 1 lower than a predetermined value?" In this case, in step S103, it is determined whether or not the output voltage is lower than the predetermined value; when affirmative, processing proceeds to step S104, and when negative, proceeds to step S102.

Figure 10:
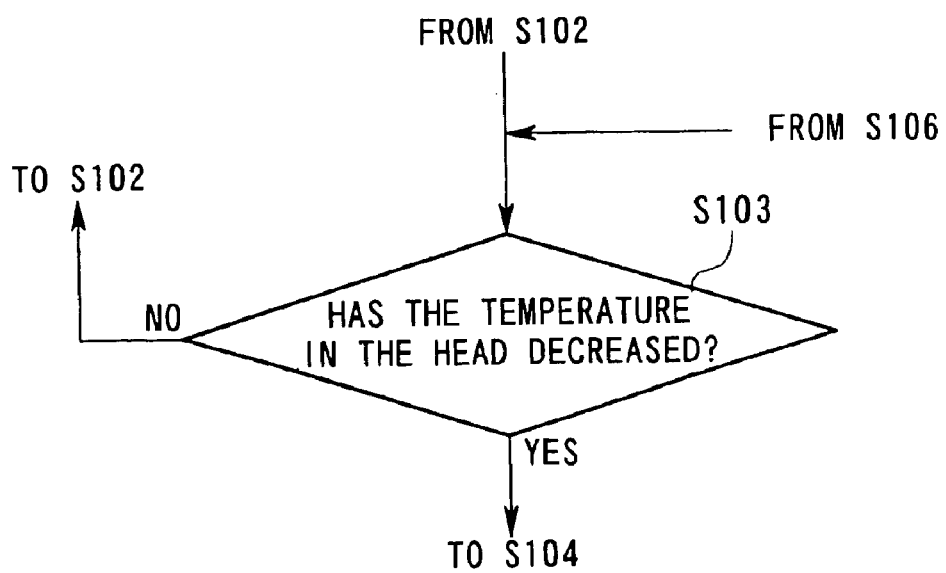

FIG. 10 shows a case where the determination reference regarding whether or not to open the drainage control valves 19 and 20 is "Has the temperature in the entrance head 62 or the exit head 63 dropped sharply?" In this case, in step S103, it is determined whether or not the temperature has dropped sharply; when affirmative, processing proceeds to step S104, and when negative, proceeds to step S102.

The explanation of the first embodiment describes a case where the humidifier for fuel cell is applied in a fuel cell system for humidifying oxidizing agent supply gas, but the humidifier for fuel cell of the first embodiment can also be applied in a humidification system for humidifying fuel supply gas. Further, a fuel cell system comprising both the humidification system for humidifying oxidizing agent supply gas and the humidification system for humidifying fuel supply gas is also possible. The same goes for all the embodiments described below.

Embodiment 2

A second embodiment of the humidifier for fuel cell according to this invention will be explained based on FIGS. 11 and 12.

Figure 11:
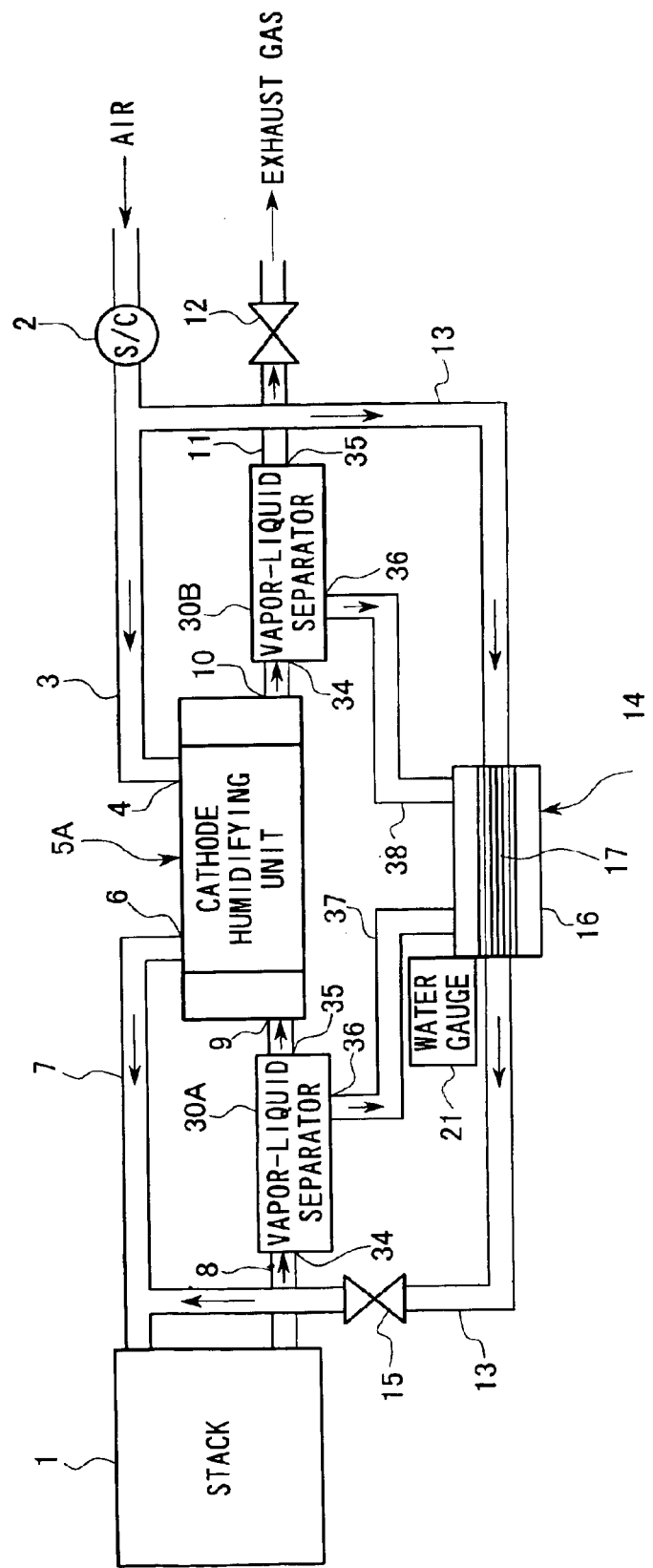
FIG. 11 is a block diagram showing a second embodiment of the humidifier for fuel cell according to this invention.
Figure 12:
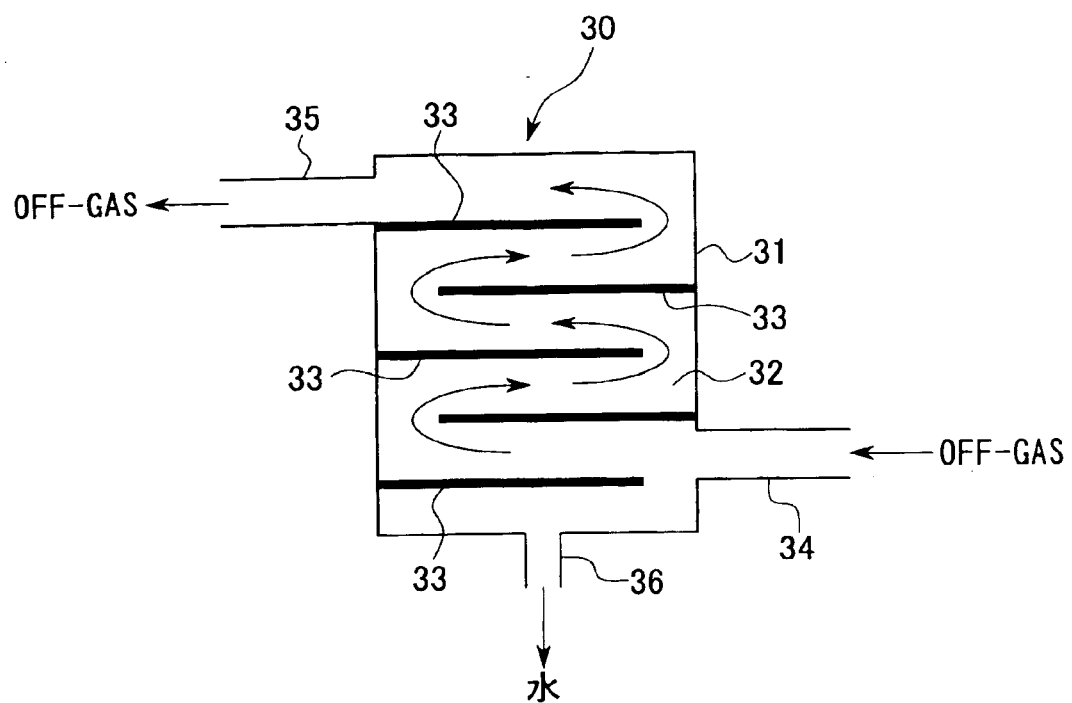
FIG. 12 is a schematic cross-sectional view of a vapor-liquid separator in the second embodiment.

FIG. 11 shows a reactive gas supply system on the cathode side of the stack 1. Parts which are identical to those in the reactive gas supply system already described in the first embodiment are represented by identical reference codes and will not be explained further. Only the points of difference with the first embodiment will be explained below.

Figure 17:
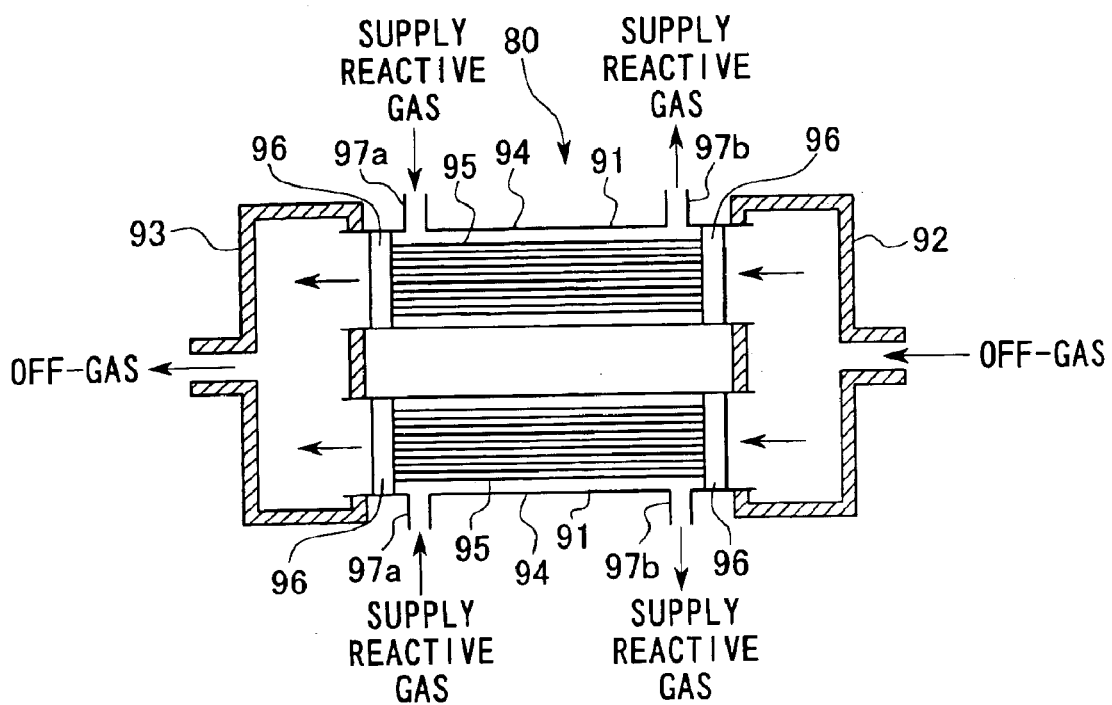
FIG. 17 is a cross-sectional view of a conventional humidifier for fuel cell.

The reactive gas supply system of the second embodiment does not include the drainage holes 67 and 68, the drainage control valves 19 and 20, and the drainage pipe 18 of the cathode humidification unit (water-permeable humidifier) 5A. That is, the cathode humidifying unit 5A of the second embodiment has the same constitution as the conventional humidifier 80 shown in FIG. 17.

Instead of the above, vapor-liquid separators 30A and 30B for cooling condensation from the off-gas (hereinafter referred to jointly as vapor-liquid separator 30, unless there is a need to distinguish them) are provided midway along the off-gas pipe 8 and midway along the off-gas pipe 11. The vapor-liquid separator 30 can comprise a demister or a moisture-permeable membrane. According to one specific example of the vapor-liquid separator 30 shown in FIG. 12, the vapor-liquid separator 30 comprises a housing 31, a great number of partitioning plates 33 which form a flow path 32 zigzagging from bottom to top inside the housing 31, an off-gas entrance (exhaust gas injection hole) 34 which is provided in the lower section of the housing 31 and connects to the flow path 32, and a drainage hole (liquid exhaust hole) 36 which is provided at the bottom of the housing 31 and connects to the flow path 32.

In the vapor-liquid separator 30, off-gas containing water is fed from the off-gas entrance 34 into the housing 31 and rises upward while zigzagging along the flow path 32. Since the water in the off-gas has a greater mass than air, as the off-gas flows along the flow path 32, the water (liquid) in the off-gas collides against the side walls of the partitioning plates 33 and the housing 31 due to its inertia, sticking to these side walls. The water which has stuck to the side walls liquefies and falls down the side walls due to gravity; when the water reaches the bottom of the housing 31 it is discharged as liquid from the drainage hole 36. On the other hand, off-gas which water has been removed from becomes saturated off-gas, and is exhausted from the off-gas exit 35. That is, when off-gas is fed through the vapor-liquid separator 30, the off-gas is vapor-liquid separated, only off-gas which excess water has been removed from being fed from the off-gas exit 35, and the excess water in the off-gas liquefies and is exhausted from the drainage hole 36.

The off-gas entrance 34 of the vapor-liquid separator 30A connects via the off-gas pipe 8 to the stack 1, the off-gas exit 35 connects via the off-gas pipe 8 to the off-gas entrance 9 of the cathode humidifying unit 5A, the drainage hole 36 connects via an exhaust pipe 37 to the inside of the housing 16 of the supplementary humidifier 14, and off-gas exhausted from the stack 1 is fed via the off-gas pipe 8 to the vapor-liquid separator 30A, saturated off-gas which excess water has been removed from is supplied via the off-gas pipe 8 to the cathode humidifying unit 5A, and the excess water in the off-gas is supplied via the exhaust pipe 37 into the housing 16 of the supplementary humidifier 14.

Further, the off-gas entrance 34 of the vapor-liquid separator 30B connects via an off-gas pipe 11 to the off-gas exit 10 of the cathode humidifying unit 5A, the off-gas exit 35 connects via the off-gas pipe 11 to the pressure adjusting valve 12, the drainage hole 36 connects via a drainage pipe 38 to the inside of the housing 16 of the supplementary humidifier 14. Off-gas, which has been exhausted from the cathode humidifying unit 5A, is fed via the off-gas pipe 11 to the vapor-liquid separator 30B, saturated off-gas which excess water has been removed from is exhausted via the off-gas pipe 11, and the excess water in the off-gas is supplied via the drainage pipe 38 into the housing 16 of the supplementary humidifier 14.

As in the first embodiment, an unillustrated controller opens and closes the control valve 15 based on a water level detected by the water level gauge 21.

In the humidifier for fuel cell of the second embodiment, the vapor-liquid separator 30A is provided midway along the off-gas pipe 8 upstream from the cathode humidifying unit 5A, whereby off-gas which excess water has been removed from is fed to the entrance head 62 of the cathode humidifying unit 5A, preventing water from condensing in the entrance head 62 and the exit head 63. Therefore, the problem of condensation blocking the hollow fiber membranes 65 of the cathode humidifying unit 5A can be prevented. It is also possible to prevent reduction in the flow path area of off-gas in the cathode humidifying unit 5A. As a result, the humidification capability and reliability of the humidifier are increased.

The water which is extracted by separation from the off-gas in the vapor-liquid separators 30A and 30B is collected in the housings 16 of the supplementary humidifier 14, and is reused as water for supplementary humidification as in the first embodiment. Consequently, the output voltage of the stack 1 at start-up and the like can be increased. Further, the water extracted in the vapor-liquid separators 30A and 30B can be fed to the supplementary humidifier 14 without being cooled, making it possible to perform supplementary humidification without applying heat from the outside.

Embodiment 3

Figure 13:
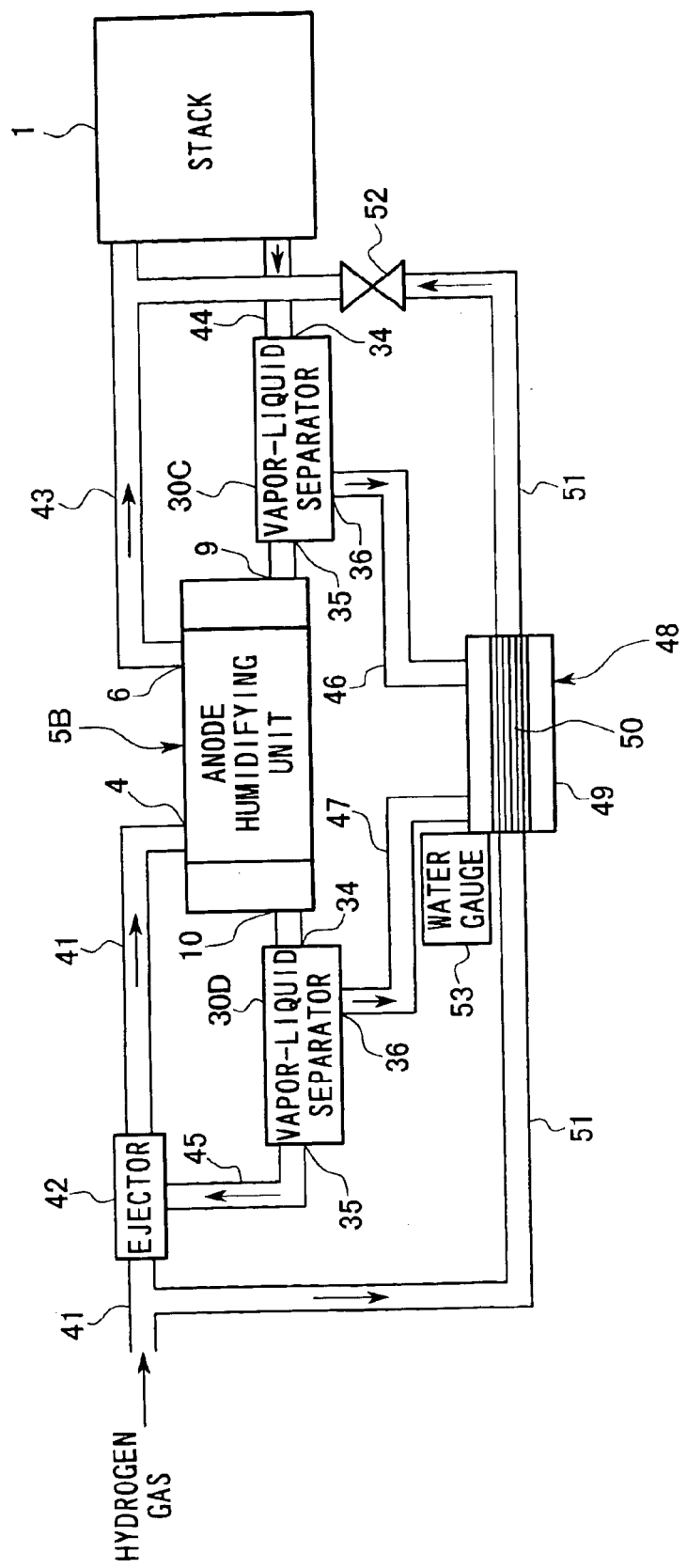
FIG. 13 is a block diagram showing a third embodiment of the humidifier for fuel cell according to this invention.

Subsequently, the humidifier for fuel cell according to a third embodiment of the present invention will be explained with reference to FIG. 13. FIG. 13 shows a reactive gas supply system on the anode side of the stack 1. The anode humidifying unit (water-permeable humidifier) 5B used in this embodiment is the same as the cathode humidifying unit 5A in the second embodiment; same parts are represented by same reference codes and are not explained further.

Fuel cell supply gas comprises hydrogen gas, and is supplied via a hydrogen supply pipe 41 having an ejector 42 midway therealong from the reactive gas entrance 4 to the anode humidifying unit 5B. After being humidifying while passing through the anode humidifying unit 5B, the hydrogen gas is fed from a reactive gas exit 6 of the anode humidifying unit 5B to a hydrogen supply pipe 43, then along the hydrogen supply pipe 43 to the anode of the stack 1. Part of the hydrogen supplied to the anode is used as fuel, and applied in the oxidation-reduction reaction. After part of the hydrogen gas has been applied in the reaction, it is exhausted from the stack 1 as off-gas. As described above, due to the ion hydration effect of the solid polymer electrolytic membrane of the stack 1, water in the off-gas flowing on the cathode side becomes steam vapor after passing through the solid polymer electrolytic membrane, and is dispersed into the hydrogen flowing on the anode side.

The off-gas from the hydrogen exhausted from the stack 1 is exhausted to an off-gas pipe 44, which a vapor-liquid separator 30C is provided midway along, supplied via the off-gas pipe 44 from an off-gas entrance (exhaust gas entrance) 9 to the anode humidifying unit 5B, and, while passing through the anode humidifying unit 5B, steam vapor in the off-gas is transferred to the hydrogen gas as reactive gas, thereby humidifying the hydrogen gas. Thereafter, the off-gas is exhausted from an off-gas exit (exhaust gas exit) 10 of the anode humidifying unit 5B to an off-gas pipe 45, which a vapor-liquid separator 30D is provided midway along, and supplied to a secondary flow entrance of the ejector 42. In the ejector 42, negative pressure caused by the flow of hydrogen gas, which has been supplied to the ejector from the hydrogen supply pipe 41, absorbs the off-gas fed via the off-gas pipe 45 and supplies a mixture of hydrogen gas and off-gas to the anode humidifying unit 5B.

The constitutions of the vapor-liquid separators 30C and 30D are the same as the vapor-liquid separators 30A and 30B in the second embodiment, and for this reason will not be explained in further detail. The off-gas entrance 34 of the vapor-liquid separator 30C connects via the off-gas pipe 44 to the stack 1, the off-gas exit 35 connected via the off-gas pipe 44 to the off-gas entrance 9 of the anode humidifying unit 5B, the drainage hole 36 connected via a drainage pipe 46 to the inside of a housing 49 of a supplementary humidifier 48 explained later, off-gas exhausted from the stack 1 being fed via the off-gas pipe 44 to the vapor-liquid separator 30C, which separates vapor and liquid in the off-gas. Saturated off-gas, which excess water has been removed from, is supplied via the off-gas pipe 44 to the anode humidifying unit 5B, and the excess water in the off-gas liquefies and is supplied via the exhaust pipe 46 into the housing 49 of the supplementary humidifier 48.

The off-gas entrance 34 of the vapor-liquid separator 30D connects via an off-gas pipe 45 to the off-gas exit 10 of the anode humidifying unit 5B, the off-gas exit 35 connects via the off-gas pipe 45 to the ejector 42, the drainage hole 36 connects via a drainage pipe 47 to the inside of the housing 49 of the supplementary humidifier 48. Off-gas, which has been exhausted from the anode humidifying unit 5B, is fed via the off-gas path 45 to the vapor-liquid separator 30D, which separates vapor and liquid in the off-gas. Saturated off-gas, which excess water has been removed from, is supplied via the off-gas pipe 45 to the ejector 42, and the excess water in the off-gas liquefies and is supplied via the exhaust pipe 47 into the housing 49 of the supplementary humidifier 48. In the third embodiment, the housing 49 comprises the storage unit of this invention.

In the hydrogen supply pipe 41, the air supply pipe 43 and the components which are upstream from the ejector 42 are connected by a bypass pipe 51, which bypasses the anode humidifying unit 5B, the supplementary humidifier 48 and a supplementary humidification control valve 52 being provided in sequence upstream along the bypass pipe 51. The constitution of the supplementary humidifier 48 is the same as that of the supplementary humidifier 14 in the first and second embodiments, and comprises a great number of hollow fiber membranes 50 which are bundled inside the housing 49, and, when the supplementary humidification control valve 52 is open, hydrogen gas, which has flowed from the hydrogen supply pipe 41 along the bypass pipe 51, passes through the inside of the hollow fiber membranes 50 and through the downstream bypass pipe 51 and the supplementary humidification control valve 52 and into the hydrogen supply pipe 43, converges with hydrogen gas which has passed through the anode humidifying unit 5B and is supplied to the stack 1. As already explained, the housing 49 connects via the drainage pipes 46 and 47 to the drainage holes 36 of the vapor-liquid separators 30C and 30D, and liquid (water) which has been separated from off-gas by the vapor-liquid separators 30C and 30D is fed into the housing 49. In the third embodiment, the supplementary humidifier 48, the bypass pipe 51, and the supplementary humidification control valve 52 comprise a supplementary humidification unit.

The supplementary humidifier 48 comprises a water gauge 53 which detects the water level of water in the housing 49. The function of the supplementary humidifier 48 is the same as in the first and second embodiments. That is, when air is fed into the hollow fiber membranes 50 while water is still stored in the housing 49, the water in the housing 49 is vaporized by the ion hydration effect of the hollow fiber membranes 50, and becomes steam vapor which permeates the hollow fiber membranes 50 and is transferred to the hydrogen gas therein, humidifying the hydrogen gas.

As in the case of the supplementary humidification control valve 15 of the first embodiment, an unillustrated controller opens and closes the supplementary humidification control valve 52 based on a water level detected by the water level gauge (water level detecting unit) 53.

In the humidifier for fuel cell of the third embodiment, the vapor-liquid separator 30C is provided midway along the off-gas pipe 44 upstream from the anode humidifying unit 5B, whereby off-gas, which excess water has been removed from, is fed to the entrance head 62 of the anode humidifying unit 5B, preventing water from condensing in the entrance head 62 and the exit head 63. Therefore, the problem of condensation blocking the hollow fiber membranes 65 of the anode humidifying unit 5B can be prevented. There is also no reduction in the flow path area of off-gas in the anode humidifying unit 5B. As a result, the humidification capability and reliability of the humidifier are increased.

The water which is extracted by separation from the off-gas in the vapor-liquid separators 30C and 30D is collected in the housings 49 of the supplementary humidifier 48, and is reused as water for supplementary humidification as in the first and second embodiments. Consequently, the output voltage of the stack 1 at start-up and the like can be increased. Further, the water extracted in the vapor-liquid separators 30C and 30D can be fed to the supplementary humidifier 48 without being cooled, making it possible to perform supplementary humidification without applying heat from the outside.

Embodiment 4

Figure 14:
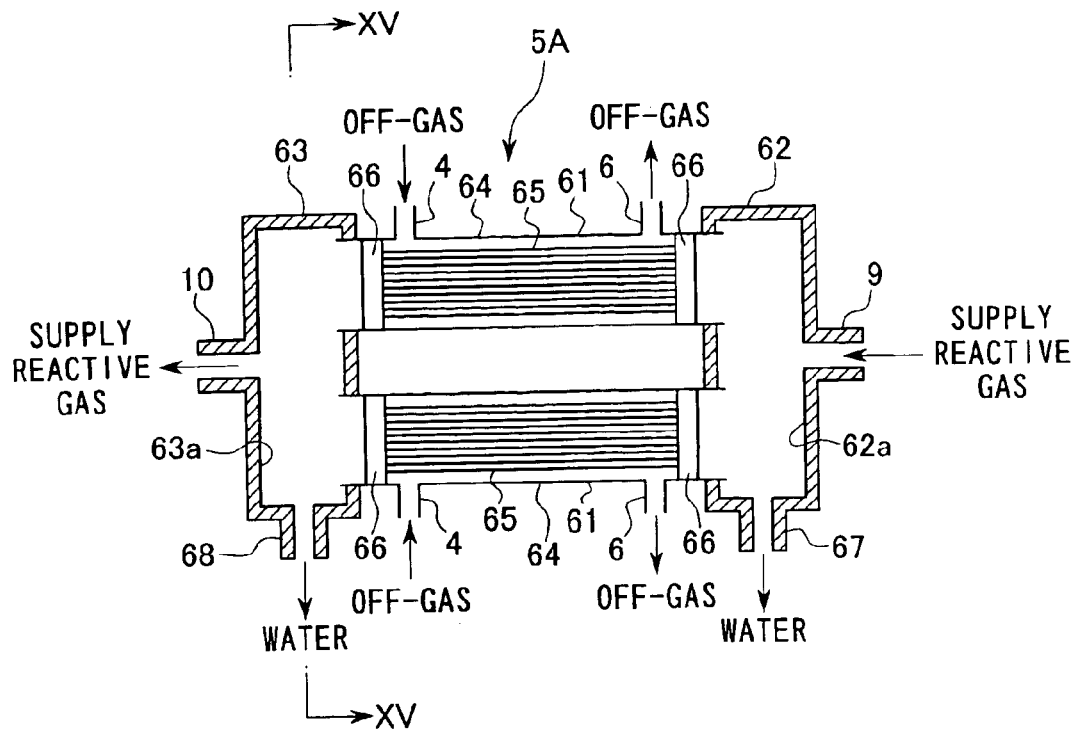
FIG. 14 is a cross-sectional view of a cathode humidifier in a fourth embodiment.
Figure 15:
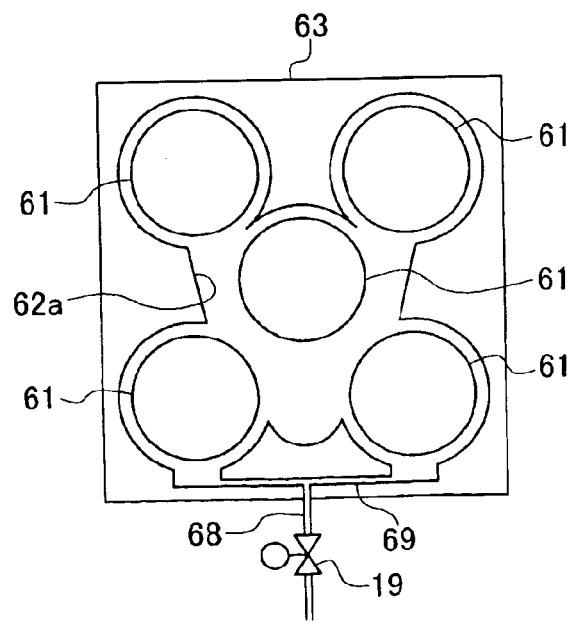
FIG. 15 is a cross-sectional view taken along the line XV—XV of FIG. 14.
Figure 16:
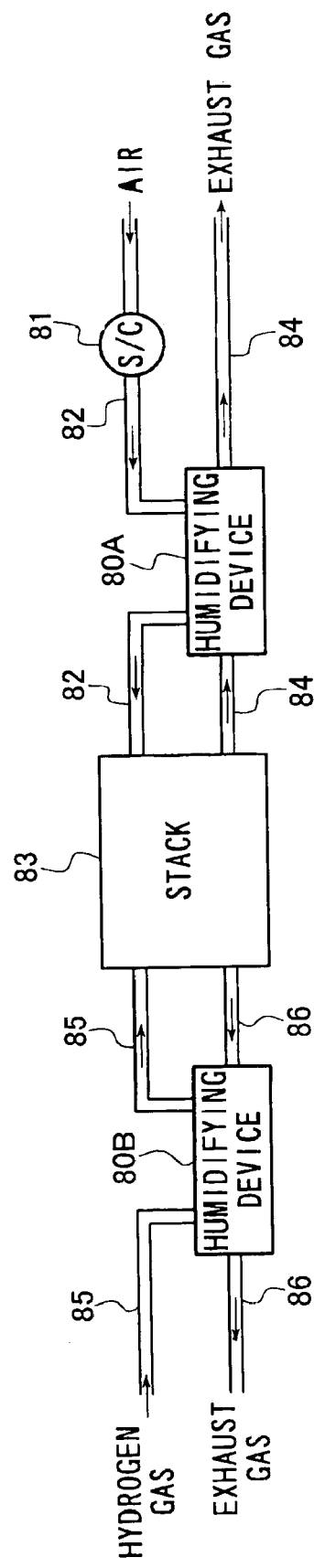
FIG. 16 is a block diagram of a conventional humidifier for fuel cell.

Subsequently, the humidifier for fuel cell according to a fourth embodiment of the present invention will be explained with reference to FIGS. 14 and 15. The fourth embodiment features a different method for supplying gas to the cathode humidifying unit 5A from that described above, but the constitution may otherwise be the same as that of the first embodiment.

In the fourth embodiment, reactive gas (air or hydrogen) is supplied from the gas entrance 9 of the cathode humidifying unit 5A, passes inside the hollow fiber membranes 65 in the hollow fiber membrane modules 61, and is exhausted from the gas exit 10. On the other hand, off-gas (damp air or damp hydrogen) is supplied from the gas entrance 4, passes along the outer face of the hollow fiber membranes 65 and inside the housings 64, and is led out from the gas exit 6. In this process, part of the water in the off-gas is transferred to the reactive gas, thereby humidifying the reactive gas.

By using this type of gas supply method, water generated from reactive gas inside the entrance head 62 is exhausted from the drainage hole 67, and water generated in the exit head 63 is exhausted from the drainage hole 68. The water, exhausted from the drainage holes 67 and 68 is supplied via the drainage control valves 19 and 20 to the supplementary humidifier 14, as in the first embodiment. As described above, the drainage control valves 19 and 20 are controlled by an unillustrated controller.

In the first embodiment, the temperature of the reactive gas sometimes decreases as the reactive gas passes the hollow fiber membrane module, causing water in the reactive gas to condense and liquefy. When this liquid is supplied with the reactive gas to the fuel cell, there is a problem that the fuel cell will become excessively humidified, and that a great amount of liquid will make the gas flow path narrow. This phenomena is apt to occur, for example, when the fuel cell is just started and the temperature of the fuel cell is lower than that during operating. Therefore, when the fuel cell is just started, it is desirable that the valves 19 and 20 be opened for a predetermined period of time in order to drain out water condensed in the cathode humidifying unit 5A.

The fourth embodiment has the advantages that it is possible to remove the excess liquid, which has been generated from the reactive gas supplied to the fuel cell, and thereby control the flow of liquid to the fuel cell, preventing flooding in the gas flow path caused by excess humidification of the fuel cell membrane and a great amount of generated water.

What is claimed is:

1. A humidifier for fuel cell comprising:
    a hollow fiber membrane module having a hollow fiber membrane bundle, comprising a plurality of hollow fiber membranes bundled together, and a housing which accommodates the hollow fiber membrane bundle, the hollow fiber membrane module feeding a reactive gas, which is to be supplied to a fuel cell, inside the housing and outside the hollow fiber membranes, and feeding off-gas, exhausted from the fuel cell, into the hollow fiber membranes, thereby transferring water in the off-gas via the hollow fiber membranes to the reactive gas and humidifying the reactive gas;
    an off-gas flow entrance which the off-gas flows through into the hollow fiber membrane, the off-gas flow entrance being provided in one end of the hollow fiber membrane module;
    a liquid exhaust mechanism which exhausts liquid, which has been generated from the off-gas flowing through the off-gas flow entrance; and
    a water blockage detecting unit which detects water blockage of the hollow fiber membrane in the off-gas flow entrance
    wherein the liquid exhaust mechanism is controlled in accordance with a detection result of the water blockage detecting unit, is provided below the off-gas flow entrance, and is separate from reactive gas exits from which the reactive gas is exhausted from the humidifier.

2. A humidifier for fuel cell according to claim 1, further comprising a controller which controls the liquid exhaust mechanism in accordance with the humidification status of the fuel cell.

3. A humidifier for fuel cell according to claim 1, wherein the liquid exhaust mechanism comprises at least one drainage hole provided below the off-gas flow entrance.

4. A humidifier for fuel cell comprising:
    a hollow fiber membrane module having a hollow fiber membrane bundle, comprising a plurality of hollow fiber membranes bundled together, and a housing which accommodates the hollow fiber membrane bundle, the hollow fiber membrane module feeding off-gas, exhausted from a fuel cell, inside the housing and outside the hollow fiber membranes, and feeding a reactive gas to be supplied to the fuel cell into the hollow fiber membranes, thereby transferring water in the off-gas via the hollow fiber membranes to the reactive gas and humidifying the reactive gas;
    a supply gas flow exit through which the reactive gas is exhausted from inside the hollow fiber membranes, the supply gas flow exit being provided in one end of the hollow fiber membrane module; and
    a liquid exhaust mechanism which exhausts liquid, which has been generated from the reactive gas fed through the supply gas flow exit;
    a water level sensor, which detects accumulation of water in the supply gas feed exit; and
    a controller, which uses the liquid exhaust mechanism to exhaust the water when the water level sensor has detected that water is accumulating,
    wherein the liquid exhaust mechanism is provided below the supply gas flow exit, and is separate from off-gas exits from which the off-gas is exhausted from the humidifier.

5. A humidifier for fuel cell according to claim 4, further comprising a controller which controls the liquid exhaust mechanism in accordance with the humidification status of the fuel cell.

6. A humidifier for fuel cell according to claim 4, wherein the liquid exhaust mechanism comprises at least one drainage hole provided below the supply gas flow exit.

7. A humidifier for fuel cell according to claim 4, further comprising a storing unit which stores the exhausted liquid, and a supplementary humidification unit which performs supplemental humidification of the reactive gas by using the liquid stored in the storing unit.

8. A humidifier for fuel cell comprising:
    a hollow fiber membrane module having a hollow fiber membrane bundle, comprising a plurality of hollow fiber membranes bundled together, and a housing which accommodates the hollow fiber membrane bundle, the hollow fiber membrane module feeding a reactive gas, which is to be supplied to a fuel cell, inside the housing and outside the hollow fiber membranes, and feeding off-gas, exhausted from the fuel cell, into the hollow fiber membranes, thereby transferring water in the off-gas via the hollow fiber membranes to the reactive gas and humidifying the reactive gas;
    an off-gas flow entrance which the off-gas flows through into the hollow fiber membrane, the off-gas flow entrance being provided in one end of the hollow fiber membrane module;

a liquid exhaust mechanism which exhausts liquid, which has been generated from the off-gas flowing through the off-gas flow entrance;

a storing unit which stores the exhausted liquid; and a supplement humidification unit which performs supplemental humidification of the reactive gas by using the liquid stored in the storing unit, wherein the liquid exhaust mechanism is provided below the off-gas flow entrance, and is separate from reactive gas exits from which the reactive gas is exhausted from the humidifier.

9. A humidifier for fuel cell according to claim 8, wherein the liquid exhaust mechanism comprise at least one drainage hole provided below the off-gas flow entrance.

10. A humidifier for fuel cell comprising:

a hollow fiber membrane module having a hollow fiber membrane bundle, comprising a plurality of hollow fiber membranes bundled together, and a housing which accommodates the hollow fiber membrane bundle, the hollow fiber membrane module feeding a reactive gas, which is to be supplied to a fuel cell, inside the housing and outside the hollow fiber membranes, and feeding off-gas, exhausted from the fuel cell, into the hollow fiber membranes, thereby transferring water in the off-gas via the hollow fiber membranes to the reactive gas and humidifying the reactive gas;

an off-gas low entrance which the off-gas flows through into the hollow fiber membrane, the off-gas flow entrance being provided in one end of the hollow fiber membrane module;

a liquid exhaust mechanism which exhausts liquid, which has been generated from the off-gas flowing through the off-gas flow entrance;

an output power detecting unit, which detects an output power of the fuel cell; and a controller, which uses the liquid exhaust mechanism to exhaust the liquid when the output power detected by the output power detecting unit is below a predetermined value, wherein the liquid exhaust mechanism is provided below the off-gas flow entrance, and is separate from reactive gas exits from which the reactive gas is exhausted from the humidifier.

11. A humidifier for fuel cell according to claim 10, wherein the liquid exhaust mechanism comprise at least one drainage hole provided below the off-gas flow entrance.

12. A humidifier for fuel cell comprising:

a hollow fiber membrane module having a hollow fiber membrane bundle, comprising a plurality of hollow fiber membranes bundled together, and a housing which accommodates the hollow fiber membrane bundle, the hollow fiber membrane module feeding a reactive gas, which is to be supplied to a fuel cell, inside the housing and outside the hollow fiber membranes, and feeding off-gas, exhausted from the fuel cell, into the hollow fiber membranes, thereby transferring water in the off-gas via the hollow fiber membranes to the reactive gas and humidifying the reactive gas;

an off-gas flow entrance which the off-gas flows through into the hollow fiber membrane, the off-gas flow entrance being provided in one end of the hollow fiber membrane module;

a liquid exhaust mechanism which exhausts liquid, which has been generated from the off-gas flowing through the off-gas flow entrance; and a controller which controls the liquid exhaust mechanism in accordance with the humidification status of the fuel cell, wherein the liquid exhaust mechanism is provided below the off-gas flow entrance, and is separate from reactive gas exits from which the reactive gas is exhausted from the humidifier.

13. A humidifier for fuel cell according to claim 12, wherein the liquid exhaust mechanism comprises at least one drainage hole provided below the off-gas flow entrance.

14. A humidifier for fuel cell according to claim 12, further comprising a storing unit which stores the exhausted liquid, and a supplementary humidification unit which performs supplemental humidification of the reactive gas by using the liquid stored in the storing unit.

15. A humidifier for fuel cell comprising:

a hollow fiber membrane module having a hollow fiber membrane bundle, comprising a plurality of hollow fiber membranes bundled together, and a housing which accommodates the hollow fiber membrane bundle, the hollow fiber membrane module feeding off-gas, exhausted from a fuel cell, inside the housing and outside the hollow fiber membranes, and feeding a reactive gas to be supplied to the fuel cell into the hollow fiber membranes, thereby transferring water in the off-gas via the hollow fiber membranes to the reactive gas and humidifying the reactive gas;

a supply gas flow exit through which the reactive gas is exhausted from inside the hollow fiber membranes, the supply gas flow exit being provided in one end of the hollow fiber membrane module;

a liquid exhaust mechanism which exhausts liquid, which has been generated from the reactive gas fed through the supply gas flow exit;

an output power detecting unit, which detects an output power of the fuel cell; and a controller, which uses the liquid exhaust mechanism to exhaust the liquid when the output power detected by the output power detecting unit is below a predetermined value wherein the liquid exhaust mechanism is provided below the supply gas flow exit, and is separate from off-gas exits from which the off-gas is exhausted from the humidifier.

16. A humidifier for fuel cell according to claim 15, wherein the liquid exhaust mechanism comprises at least one drainage hole provided below the off-gas flow entrance.

17. A humidifier for fuel cell according to claim 15, further comprising a storing unit which stores the exhausted liquid, and a supplementary humidification unit which performs supplemental humidification of the reactive gas by using the liquid stored in the storing unit.

18. A humidifier for fuel cell comprising:

a hollow fiber membrane module having a hollow fiber membrane bundle, comprising a plurality of hollow fiber membranes bundled together, and a housing which accommodates the hollow fiber membrane bundle, the hollow fiber membrane module feeding off-gas, exhausted from a fuel cell, inside the housing and outside the hollow fiber membranes, and feeding a reactive gas to be supplied to the fuel cell into the hollow fiber membranes, thereby transferring water in the off-gas via the hollow fiber membranes to the reactive gas and humidifying the reactive gas;

a supply gas flow exit through which the reactive gas is exhausted from inside the hollow fiber membranes, the supply gas flow exit being provided in one end of the hollow fiber membrane module;

a liquid exhaust mechanism which exhausts liquid, which has been generated from the reactive gas fed through the supply gas flow exit; and a controller which controls the liquid exhaust mechanism in accordance with the humidification status of the fuel cell, wherein the liquid exhaust mechanism is provided below the supply gas flow exit, and is separate from off-gas exits from which the off-gas is exhausted from the humidifier.

19. A humidifier for fuel cell according to claim 18, wherein the liquid exhaust mechanism comprises at least one drainage hole provided below the off-gas flow entrance.

20. A humidifier for fuel cell according to claim 18, further comprising a storing unit which stores the exhausted liquid, and a supplementary humidification unit which performs supplemental humidification of the reactive gas by using the liquid stored in the storing unit.

* * * * *